(12) United States Patent
Georgelos et al.

(10) Patent No.: US 9,248,947 B2
(45) Date of Patent: Feb. 2, 2016

(54) FILM FOR THERMAL ADHESION TO A RIGID BIOPOLYMER STRUCTURE

(75) Inventors: Paul Georgelos, Naperville, IL (US); Pat Montefusco, Genoa, IL (US); Jeanne M. Skaggs, Arlington Heights, IL (US); James J. Sanfilippo, Barrington Hills, IL (US)

(73) Assignee: CLEAR LAM PACKAGING, INC., Elk Grove Village, IL (US)

( * ) Notice: Subject to any disclaimer, the term of this patent is extended or adjusted under 35 U.S.C. 154(b) by 294 days.

(21) Appl. No.: 12/861,551

(22) Filed: Aug. 23, 2010

(65) Prior Publication Data

US 2011/0049002 A1    Mar. 3, 2011

Related U.S. Application Data

(60) Provisional application No. 61/238,040, filed on Aug. 28, 2009.

(51) Int. Cl.
*B32B 27/36* (2006.01)
*B65D 77/20* (2006.01)
(Continued)

(52) U.S. Cl.
CPC .............. *B65D 77/2024* (2013.01); *B32B 7/12* (2013.01); *B32B 9/02* (2013.01); *B32B 27/08* (2013.01);
(Continued)

(58) Field of Classification Search
CPC .............. B32B 1/00; B32B 1/02; B32B 1/04; B32B 1/08; B32B 21/00; B32B 21/04; B32B 21/042; B32B 21/06; B32B 21/08; B32B 23/00; B32B 23/04; B32B 23/06; B32B 23/08; B32B 23/20; B32B 23/22; B32B 27/30; B32B 27/32; B32B 27/36; B32B 29/00; B32B 29/002; B32B 29/005; B65D 25/00; B65D 25/20; B65D 25/205; B65D 90/02; B65D 90/04; B65D 90/041–90/045
USPC .................... 428/34.1, 34.2, 34.3, 34.8, 34.9, 428/35.2–35.4, 35.7, 36.6, 36.91, 411.1, 428/474.4–483, 500, 507–509, 511–513, 428/515–521, 523, 532–535, 537.5
See application file for complete search history.

(56) References Cited

U.S. PATENT DOCUMENTS 5,053,482 A    10/1991    Tietz
5,097,004 A    3/1992    Gallagher et al.
(Continued)

FOREIGN PATENT DOCUMENTS

WO    2008021811 A1    2/2008

OTHER PUBLICATIONS

Liu, L., Bioplastics in Food Packaging: Innovative Technologies for Biodegradable Packaging. San Jose State University Packaging Engineering [online], Feb. 2006 [retrieved on Aug. 17, 2010]. Retrieved from the Internet:<URL http://www.iopp.org/files/public/SanJoseLiuCompetitionFeb06.pdf>.
(Continued)

*Primary Examiner* — Walter B Aughenbaugh
(74) *Attorney, Agent, or Firm* — Marshall, Gerstein & Borun LLP (57) ABSTRACT

A film formed from biopolymer lamination for thermal lamination to a rigid biopolymer structure including a polymer layer; a biopolymer layer; and an adhesive layer joining the polymer layer to the biopolymer layer. The biopolymer layer is thermally adherable to the rigid biopolymer structure.

23 Claims, 6 Drawing Sheets

(51) Int. Cl.
  *B32B 7/12*    (2006.01)
  *B32B 9/02*    (2006.01)
  *B32B 27/08*   (2006.01)
  *B32B 27/32*   (2006.01)
  *B65B 1/02*    (2006.01)
  *B65B 3/02*    (2006.01)
  *B65B 7/16*    (2006.01)
  *B65B 47/06*   (2006.01)
  *B65B 47/10*   (2006.01)
  *B65B 51/22*   (2006.01)

(52) U.S. Cl.
  CPC ............... *B32B 27/32* (2013.01); *B32B 27/36* (2013.01); *B32B 2250/24* (2013.01); *B32B 2307/7163* (2013.01); *B32B 2439/40* (2013.01); *B65B 1/02* (2013.01); *B65B 3/02* (2013.01); *B65B 7/164* (2013.01); *B65B 47/06* (2013.01); *B65B 47/10* (2013.01); *B65B 51/225* (2013.01); *B65D 2577/2025* (2013.01); *Y10T 156/10* (2015.01); *Y10T 428/31721* (2015.04); *Y10T 428/31725* (2015.04); *Y10T 428/31786* (2015.04); *Y10T 428/31797* (2015.04); *Y10T 428/31931* (2015.04); *Y10T 428/31971* (2015.04)

(56) References Cited

U.S. PATENT DOCUMENTS

| | | | |
|---|---|---|---|
| 5,097,005 | A | 3/1992 | Tietz |
| 5,295,985 | A | 3/1994 | Romesser et al. |
| 5,498,692 | A | 3/1996 | Noda |
| 5,747,633 | A | 5/1998 | Ito et al. |
| 6,080,478 | A * | 6/2000 | Karhuketo .................. 428/340 |
| 7,678,444 | B2 * | 3/2010 | Tedford et al. ............... 428/212 |
| 7,951,436 | B2 * | 5/2011 | Knoerzer et al. ............ 428/35.3 |
| 8,133,558 | B2 * | 3/2012 | Tweed et al. ................ 428/35.7 |
| 2007/0099016 | A1 * | 5/2007 | Nakamura et al. ........... 428/480 |
| 2009/0148713 | A1 | 6/2009 | Lee et al. |

OTHER PUBLICATIONS

Kolybaba, M. et al., Biodegradable Polymers: Past, Present and Future, ASAE, 2003 CSAE/ASAE Annual Intersectional Meeting, Paper No. RRV03-0007, [online], Oct. 3-4, 2003 [retrieved on Aug. 17, 2010]. Retrieved from the Internet: <URLhttp://averousl.free.fr/fichiers/Biodegradable%20Polymers%20Past,%20Present,%20and%20Future%20(Eng).pdf.>.

* cited by examiner

FILM FOR THERMAL ADHESION TO A RIGID BIOPOLYMER STRUCTURE

CLAIM FOR PRIORITY

This application claims priority from U.S. Provisional Application Ser. No. 61/238,040 filed Aug. 28, 2009, the complete subject matter of which is incorporated herein by reference in its entirety.

FIELD OF THE INVENTION

The invention relates to films. More particularly, embodiments of this invention relate to films for thermal adhesion to a rigid biopolymer structure.

BACKGROUND OF THE INVENTION

Multi-layered films are useful in forming hermetic seals, protecting packaged food products from loss of flavor, staleness, or spoilage due to light, oxygen and moisture. In addition, multi-layered films prevent undesirable leaching of the product to the outside of the film. For example, oily food products have the potential for some oil to leach out of the package.

Currently, extrusion houses purchase petroleum-based polymer films from commercial sources. These houses then nip laminate the polymer film to rigid petroleum based or polymeric sheets during production, forming barrier or non-barrier sheets, films or structures. Such petroleum-based films are unsuitable for thermal lamination systems currently in use when the extruded rigid stock is biopolymer based sheet, as the petroleum-based films do not adhere well to biopolymers and do separate from the biopolymers after a few weeks.

One approach to the problem has been to use adhesive bonding to join biopolymer material to traditional petrochemical packaging stock. Unfortunately, most rigid fabrication facilities lack the equipment for adhesive bonding. Adhesive bonding also adds steps to the fabrication process, increasing the complexity of and time for fabrication. Thus, adhesive bonding increases capital and production costs, and reduces run speeds.

For the foregoing reasons, it would be desirable to have a film for thermal adhesion to a rigid biopolymer structure that solves the above problems.

SUMMARY OF THE INVENTION

One embodiment of the present invention relates to a film for thermal adhesion to a rigid biopolymer structure, including a petroleum based polymer layer, a biopolymer layer and an adhesive layer. The adhesive layer joins the polymer layer to the biopolymer layer, and the biopolymer layer is thermally adherable or laminatable to the rigid biopolymer structure. The whole structure or part thereof may be a barrier against matter selected from the group consisting of moisture, oxygen, carbon dioxide, aroma and contaminants.

Another embodiment of the present invention includes a method for forming a film for thermal adhesion or lamination to a rigid biopolymer structure. The method includes forming a polymer layer; forming a biopolymer layer; and applying an adhesive layer to at least one of the polymer and the biopolymer layers. The polymer layer is joined to the biopolymer layer, wherein the biopolymer layer is thermally adherable or laminatable to the rigid biopolymer structure.

Yet another embodiment of the present invention includes a method of forming a packaging including providing a film for thermal adhesion or lamination and providing a rigid biopolymer structure, such that the film (generally a polymer layer) can provide a barrier against matter selected from the group consisting of moisture, oxygen, carbon dioxide, aromas and contaminants. The film includes a polymer layer; a biopolymer layer; and an adhesive layer joining the polymer layer to the biopolymer layer. The film and the rigid biopolymer structure are formed, generally, by thermally adhering or laminating the biopolymer layer to the rigid biopolymer structure.

Yet another embodiment of the present invention includes a film for thermal adhesion to a rigid biopolymer structure including a biopolymer layer; a polymer layer; an adhesive layer joining the biopolymer layer to the polymer layer; and a rigid polymer layer joined to the polymer layer.

Yet another embodiment of the present invention relates to a package formation including a biopolymer layer and a rigid biopolymer structure. The biopolymer layer is thermally adherable to the rigid biopolymer structure.

The foregoing and other features and advantages of the invention will become further apparent from the following detailed description of the presently preferred embodiment, read in conjunction with the accompanying drawings. The drawings are not to scale. The detailed description and drawings are merely illustrative of the invention rather than limiting, the scope of the invention being defined by the appended claims and equivalents thereof.

BRIEF DESCRIPTION OF THE DRAWINGS

Throughout the various figures, like reference numbers refer to like elements.

DETAILED DESCRIPTION OF PRESENTLY PREFERRED EMBODIMENTS

As defined herein, the term "bond strength" refers to the grams of force required to peel one inch wide strips of laminate as described in the 180 degree peel test applied to a one inch strip of laminate and is expressed as either grams, grams of force or grams per inch of pull as described in the associated ASTM test method Number F904-98.

As defined herein, the term "clear" refers to film or laminate without bubbles and is measured in Haze units as described in the associated ASTM Haze and Luminous test Number D1003-61.

As defined herein, the term "multilayered film", "multilayered films" "multilayered structure" or "one or more layers" refers to a plurality of layers in a single film or substrate structure generally in the form of a sheet or web which may be made from a polymer material, a non-polymer material, a bio-polymer material, some combination thereof or the like for example, bonded together by any conventional means known in the art (coextrusion, extrusion coating, lamination, solvent coating, emulsion coating, suspension coating, adhesive bonding, pressure bonding, heat sealing, thermal lamination, ultrasonic welding, some combination thereof or the like for example).

As defined herein, the term "laminate" and the phrase "film laminate", when used as a noun, refers to the resulting product made by bonding together two or more substrates, layers or other materials. "laminate", "lamination", "laminated" and "thermally laminated" when used as a verb, means to affix, bond, join, connect or adhere (by means of extrusion, coextrusion, extrusion coating, lamination, solvent coating, emulsion coating, suspension coating, adhesive bonding, pressure bonding, heat sealing, thermal lamination, ultrasonic welding, some combination thereof or the like for example of two or more layers so as to form a multilayered film or structure.

As defined herein, the term "polymer" refers to the product of a polymerization reaction, and is inclusive of homopolymers, copolymers, terpolymers, or the like for example, the layers of a film or film substrate can consist essentially of a single polymer, or can have still additional polymers together therewith, i.e., blended therewith.

As defined herein, the term "copolymer" refers to polymers formed by the polymerization of at least two different monomers. For example, the term "copolymer" includes the co-polymerization reaction product of ethylene and an .alpha.-olefin, such as 1-hexene. The term "copolymer" is also inclusive of, for example, the co-polymerization of a mixture of ethylene, propylene, 1-propene, 1-butene, 1-hexene, and 1-octene. As defined herein, a copolymer identified in terms of a plurality of monomers, e.g., "propylene/ethylene copolymer", refers to a copolymer in which either a monomer may co-polymerize in a higher weight or molar percent than the other monomer or monomers. However, the first listed monomer preferably polymerizes in a higher weight percent than the second listed monomer.

As defined herein, the term "coextruded" refers to a material formed by the process of extruding two or more polymeric materials through a single die with two or more orifices arranged so that the extrudates merge and weld together into a laminar structure before chilling and solidifying. The film substrates described herein may be generally prepared from dry resins which are melted in an extruder and passed through a die to form the primary film material, most commonly in tube or sheet form. In the coextruded films described herein, all layers were simultaneously coextruded, cooled via water, chilled metal roll, or air quenching. Unless otherwise noted, the resins utilized in the present invention are generally commercially available in pellet form and, as generally recognized in the art, may be melt blended or mechanically mixed by well-known methods using commercially available equipment including tumblers, mixers or blenders. Also, if desired, well-known additives such as processing aids, slip agents, anti-blocking agents and pigments, and mixtures thereof may be incorporated into the film, by blending prior to extrusion. The resins and any additives are introduced to an extruder where the resins are melt plastified by heating and then transferred to an extrusion (or coextrusion) die for formation into a tube. Extruder and die temperatures will generally depend upon the particular resin or resin containing mixtures being processed and suitable temperature ranges for commercially available resins are generally known in the art, or are provided in technical bulletins made available by resin manufacturers. Processing temperatures may vary depending upon other processing parameters chosen.

As defined herein, the term "polyolefin" refers to homopolymers, including, e.g., bipolymers, terpolymers, etc., having a methylene linkage between monomer units which may be formed by any method known to those skilled in the art. Examples of polyolefins include polyethylene (PE), low-density polyethylene (LDPE), linear low-density polyethylene (LLDPE), very low-density polyethylene (VLDPE), ultra low-density polyethylene (ULDPE), medium-density polyethylene (MDPE), high-density polyethylene (HDPE), ultra high-density polyethylene (UHDPE), ethylene/propylene copolymers, polypropylene (PP), propylene/ethylene copolymer, polyisoprene, polybutylene, polybutene, poly-3-methylbutene-1, poly-4-methylpentene-1, ionomers, polyethylenes comprising ethylene/.alpha.-olefin which are copolymers of ethylene with one or more .alpha.-olefins (alpha-olefins) such as butene-1, hexene-1, octene-1, or the like as a comonomer, and the like.

As defined herein, the term "ionomer" refers to metal-salt, e.g., sodium or zinc, neutralized ethylene acrylic or methacrylic acid copolymers.

As defined herein, the term "polyester" refers to homopolymers or copolymers having an ester linkage between monomer units which may be formed, for example, by condensation polymerization reactions between a dicarboxylic acid and a glycol. The ester monomer unit can be represented by the general formula: [RCO.sub.2R'] where R and R'=alkyl group. The dicarboxylic acid may be linear or aliphatic, i.e., oxalic acid, malonic acid, succinic acid, glutaric acid, adipic acid, pimelic acid, suberic acid, azelaic acid, sebacic acid, and the like; or may be aromatic or alkyl substituted aromatic, i.e., various isomers of phthalic acid, such as paraphthalic acid (or terephthalic acid), isophthalic acid and naphthalic acid. Specific examples of alkyl substituted aromatic acids include the various isomers of dimethylphthalic acid, such as dimethylisophthalic acid, dimethylorthophthalic acid, dimethylterephthalic acid, the various isomers of diethylphthalic acid, such as diethylisophthalic acid, diethylorthophthalic acid, the various isomers of dimethylnaphthalic acid, such as 2,6-dimethylnaphthalic acid and 2,5-dimethylnaphthalic acid, and the various isomers of diethylnaphthalic acid. The glycols may be straight-chained or branched. Specific examples include ethylene glycol, propylene glycol, trimethylene glycol, 1,4-butane diol, neopentyl glycol and the like. An example of a preferred polyester is polyethylene terephthalate copolymer.

As defined herein, the term "nylon" refers to polyamide homopolymers, copolymers, or terpolymers having an amide linkage between monomer units which may be formed by any method known to those skilled in the art. The nylon monomer can be presented by the general formula: [CONH] or [CONR] where R=alkyl group. Useful polyamide homopolymers include nylon 6 (polycaprolactam), nylon 11 (polyundecanolactam), nylon 12 (polylauryllactam), and the like. Other useful polyamide homopolymers also include nylon 4,2 (polytetramethylene ethylenediamide), nylon 4,6 (polytetramethylene adipamide), nylon 6,6 (polyhexamethylene adipamide), nylon 6,9 (polyhexamethylene azelamide), nylon 6,10 (polyhexamethylene sebacamide), nylon 6,12 (polyhexamethylene dodecanediamide), nylon 7,7 (polyheptamethylene pimelamide), nylon 8,8 (polyoctamethylene suberamide), nylon 9,9 (polynonamethylene azelamide), nylon 10,9 (polydecamethylene azelamide), nylon 12,12 (polydodecamethylene dodecanediamide), and the like. Useful polyamide copolymers include nylon 6,6/6 copolymer (polyhexamethylene adipamide/caprolactam copolymer), nylon 6/6,6 copolymer (polycaprolactam/hexamethylene adipamide copolymer), nylon 6,2/6,2 copolymer (polyhexamethylene ethylenediamide/hexamethylene ethylenediamide copolymer), nylon 6,6/6,9/6 copolymer (polyhexamethylene adipamide/hexamethylene azelaiamide/caprolactam copolymer), as well as other nylons which are not particularly delineated here.

As defined herein, the terms "heat-seal", "heat-sealing", "heat-sealable", and the like refer to a first portion of a film surface (i.e., formed from a single layer or multiple layers) which is capable of forming a fusion bond to a second portion of a film surface. A heat-seal layer is capable of fusion bonding by conventional indirect heating means which generate sufficient heat on at least one film contact surface for conduction to the contiguous film contact surface and formation of a bond interface there between without loss of the film integrity. Heat-sealing can be performed by any one or more of a wide variety of manners, such as using a heat-seal technique (e.g., melt-bead sealing, thermal sealing, impulse sealing, ultrasonic welding, hot air, hot wire, infrared radiation, etc.).

As defined herein, the phrase "surface layer" as applied to film layers of the present invention refers to any layer having less than two of its principal surfaces directly adhered to another layer of the film laminate.

As defined herein, the terms "join', "joins" and "adheres" are used in their broad sense to mean two formerly separate portions of a single laminate or one or two layers of a substrate which are connected together either by folding the laminate or layer onto itself thereby defining an edge or by bonding two layers together (presumably, their entire planar surfaces) with an adhesive or by other means known to those skilled in the art.

As defined herein, the term "adhesive" refers to a flexible adhesive formed of a solvent or water based, polyurethane or polyester/polyether materials or the like, including dry bond, wet bond, gravure, reverse gravure, mayer rod, rollcast, serving a primary purpose or function of adhering two surfaces to one another. In the present invention, the adhesive may adhere one layer to another layer. An exemplary adhesive is the LA1150-52 adhesive available from the Henkel Corporation of Cary, N.C. Other examples of good adhesives include Rohm & Haas's L49x159 which is also a solvent based polyurethane adhesive. However, it is possible to use solventless polyurethane adhesives such as Rohm & Haas's Mor-Free 75-164. Rohm & Haas is a Philadelphia, Pa. company. The adhesive can be applied through direct gravure or reverse gravure coating. It was discovered that reverse gravure provides a much clearer adhesive layer and is one preferred embodiment. However, very good results were attained using standard direct gravure coating as well.

As defined herein the term "biodegradable" refers to material which, when the matter is exposed to an aerobic and/or anaerobic environment, the ultimate disposition is reduction to monomeric components due to microbial, hydrolytic, and/or chemical actions. Under aerobic conditions, biodegradation leads to the transformation of the material to end products such as carbon dioxide and water. Under anaerobic conditions, biodegradation leads to the transformation of the materials to carbon dioxide, water, and methane. The biodegradability process is often described as mineralization. Biodegradability means that all organic constituents of the films are subject to decomposition eventually through biological activity.

As defined herein the term "rigid" refers to a material capable of holding its shape, returning to is original shape under initial conditions and is substantially rigid in a final form.

As defined herein, "film" or "laminate" means an extremely thin continuous piece of a substance having a high length to thickness ratio and a high width to thickness ratio. While there is no requirement for a precise upper limit of thickness, a preferred upper limit would be 0.254", more preferably still about 0.01", and more preferably still about 0.005". The protective value of any film depends on its being continuous, i.e., without holes or cracks Breathable films include dispersed particulate filler, the film having been stretched to produce continuous pores that prevent penetration of liquid and that pass moisture vapor. A breathable film may be one layer of a multiplayer film. The film may be a multilayer film, i.e., a laminate or composite. A laminate is defined as two or more films joined together. A laminate may have one or more layers comprising a blended PHA/PLA composition as set forth herein. In another embodiment, a laminate may have a first layer comprising a PHA copolymer as described herein and a second layer comprising a PLA polymer or copolymer as set forth herein. The laminate may have a first layer comprising a PHA copolymer, a second layer comprising a PHA/PLA blend, and a third layer comprising PLA, or any combination of layers desired. As used, the terms first, second, or third layers are simply used to describe separate layers and are not intended to be limiting as to the location of the layer. Nonlimiting examples of other optional ingredients that may be included in the film or laminate described herein include aromatic/aliphatic polyester copolymers made more readily hydrolytically cleavable, and hence more likely biodegradable, such as those described in U.S. Pat. Nos. 5,053,482, 5,097,004, 5,097,005, and 5,295,985, biodegradable aliphatic polyesteramide polymers, polycaprolactones, polyesters or polyurethanes derived from aliphatic polyols (i.e., dialkanoyl polymers), polyamides including polyethylene/vinyl alcohol copolymers, cellulose esters or plasticized derivatives thereof, salts, slip agents, crystallization accelerators such as nucleating agents, crystallization retarders, odor masking agents, cross-linking agents, emulsifiers, surfactants, cyclodextrins, lubricants, other processing aids, optical brighteners, antioxidants, flame retardants, dyes, pigments, fillers, proteins and their alkali salts, waxes, tackifying resins, extenders, antiblocking agents, antistatic agents, or mixtures thereof. Slip agents may be used to help reduce the tackiness or coefficient of friction in the film. Also, slip agents may be used to improve film stability, particularly in high humidity or temperatures.

The present invention is in the form of a film or laminate. Such a film or laminate is described in U.S. Pat. No. 5,498, 692, incorporated herein in its entirety by reference, which uses blended or laminated compositions.

As described herein. As defined herein, "blend" means a composition having two or more ingredients (i.e. poly(3-hydroxyalkanoate) or PHA with polylactide acid or PLA or PHA with a particulate filler).

Figure 1:
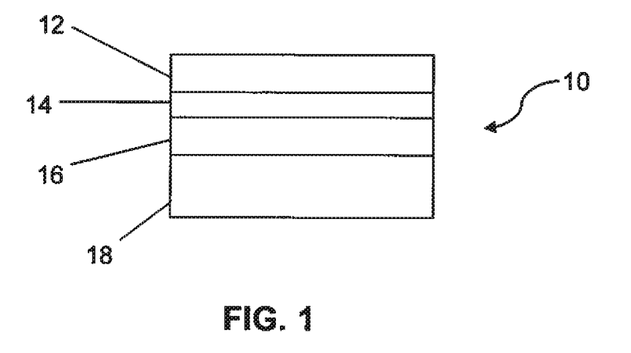
FIG. 1 is an enlarged view of the film in accordance with one embodiment of the present invention.

FIG. 1 illustrates a film 10, in accordance with one embodiment, including a polymer layer 12, an adhesive layer 14; and a biopolymer layer 16, such that the film 10 generally, or the polymer layer 12 in particular, is a barrier against matter such as moisture, oxygen, carbon dioxide, contaminants, aromas and the like.

The biopolymer layer 16 as defined herein can be any layer formed of a biopolymer material. The biopolymer layer 16 may be formed of any suitable material including polylactide acid, aliphatic-aromatic polyesters, biopolymeric resins, poly (3-hydroxyalkanoate) (PHA), cellulose, cellophane or starch based polymers, some combination thereof, or the like. In one embodiment, the biopolymer layer 16 is a monolayer or multilayer between about 0.0004 and about 0.006 inches thick (more particularly between about 0.0006 and about 0.003 inches thick). FIG. 1 further illustrates the biopolymer layer 16 is joined to a thick rigid biopolymer structure 18 (alternatively referred to as a rigid biostructure), where the rigid biopolymer structure 18 is thicker than the biopolymer layer 16.

The rigid biopolymer structure 18 as defined herein can be any structure that can be formed into a container and is substantially rigid in a final form. In at least one embodiment, the thick, rigid biopolymer structure 18 is between about 0.007 and about 0.060 inches thick (more particularly between about 0.010 and about 0.045 inches thick).

The polymer layer 12 as defined herein can be any layer formed of a polymer or copolymer material. The polymer layer may be a blown or cast film. It may be formed using an extrusion, a coextrusion or lamination processes, and in at least one embodiment, is formed of polyolefin or polyamide materials including bipolymericresins linear low-density polyethylene, low-density polyethylene, ultra-low density polyethylene, metallocene polyethylene, ethylene vinyl acetate (EVA), ionomers, polypropylene, polystyrene, or nylon, some combination thereof, or the like for example. The polymer layer 12 can be a multilayer barrier polymer layer, a multilayer non-barrier polymer layer, a monolayer barrier polymer layer or a monolayer non-barrier polymer layer, between about 0.0008 and about 0.005 inches thick (more particularly between about 0.001 and 0.003 inches thick). Additionally, the polymer layer 12 may be contaminant free to form a permanent seal with lidstock (not shown), or contain one or more peelable contaminants to form a peelable seal with lidstock.

The adhesive layer 14 as defined herein can be any layer of adhesive capable of joining the polymer layer 12 and the biopolymer layer 16. The adhesive layer 14 can be a flexible adhesive formed of a solvent based, polyurethane material or the like. An exemplary adhesive is the LA1150-52 adhesive available from the Henkel Corporation of Cary, N.C.

Figure 2:
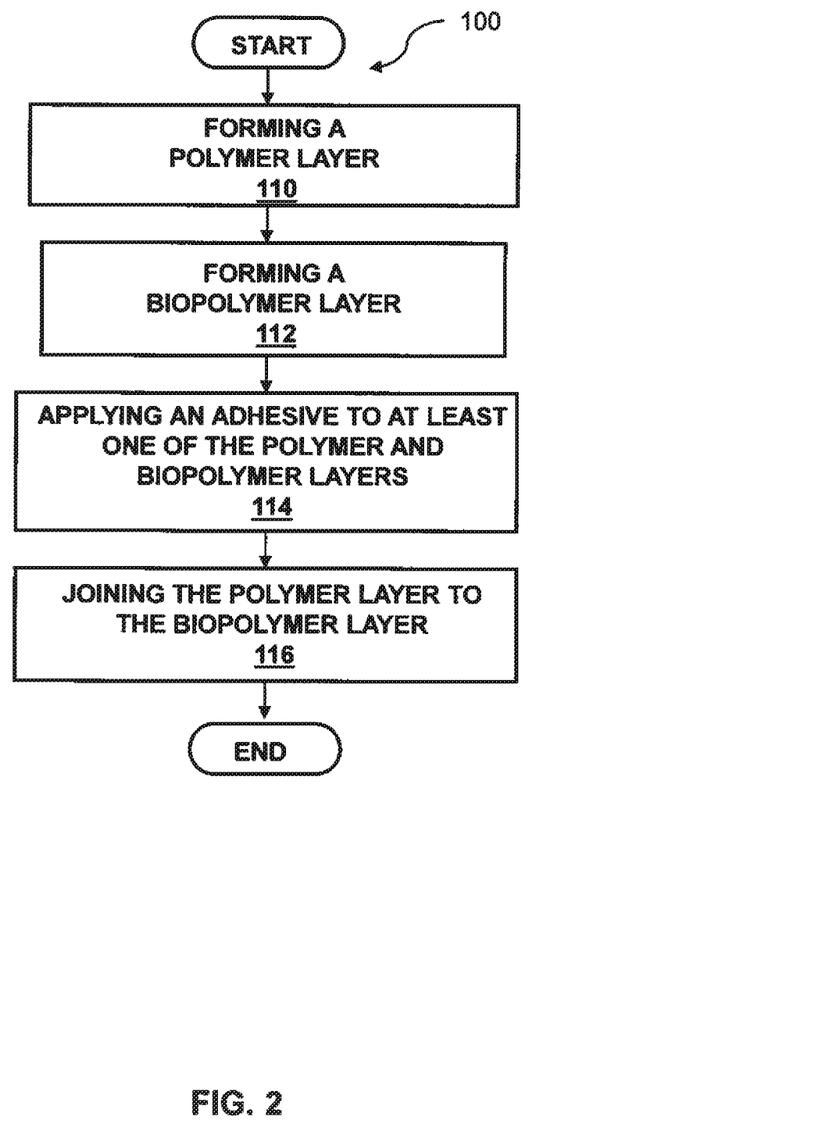
FIG. 2 is a flowchart of a method for forming a film for thermal lamination to a rigid biopolymer structure.

FIG. 2 is a flow chart illustrating the method of forming the film, generally designated 100. The method 100 includes forming a polymer layer, block 110; forming a biopolymer layer, block 112; and applying an adhesive layer to at least one of the polymer layer and the biopolymer layer, block 114. In one embodiment the polymer layer is joined to the biopolymer layer, block 116. In at least one embodiment, the joined polymer and biopolymer layers have a bond strength greater than 800 grams per inch of pull (more particularly 1000 grams per inch of pull) and is clear (i.e., has a haze measurement of not higher or greater than 13% as described in the associated ASTM Test D1003-61

Method 100 may further comprise the biopolymer layer is thermally adherable or laminatable to the rigid biopolymer structure. The polymer layer acts a barrier against matter selected from the group consisting of moisture, oxygen, carbon dioxide, contaminants and aromas. The method may further include joining lidstock to the polymer layer, where the bond between the lidstock and the polymer layer, may be peelable or non-peelable.

Figure 3:
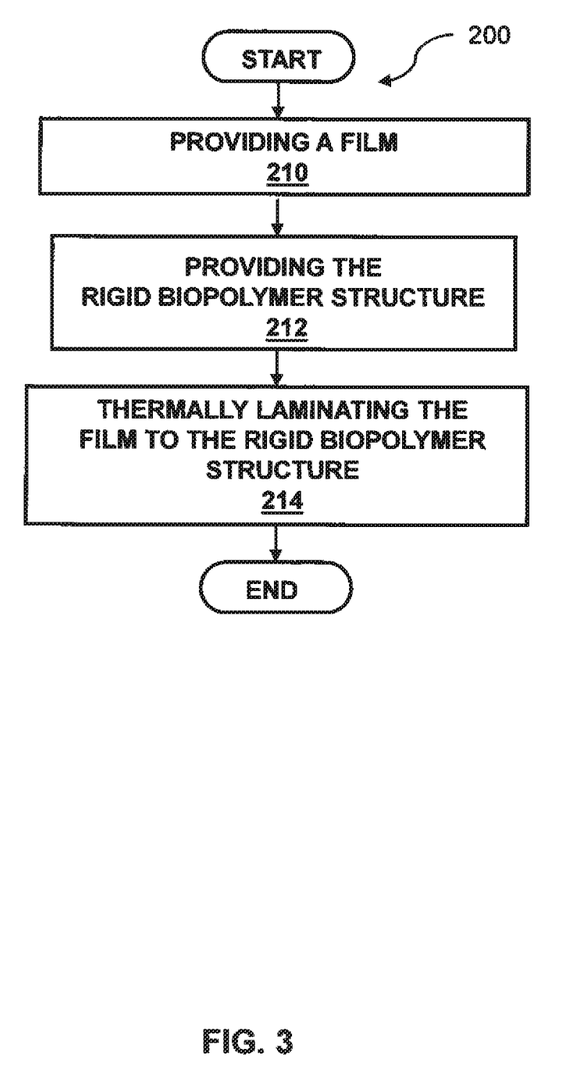
FIG. 3 is a flow chart of a method of packaging formation including providing a film for thermal adhesion and providing a rigid biopolymer structure.

FIG. 3 illustrates a flow chart showing a method of packaging formation, generally designated 200. The method 200 includes providing a film, block 210, including a polymer layer, a biopolymer layer, and an adhesive layer joining the polymer layer to the biopolymer layer. Method 200 further includes providing a rigid biopolymer structure, block 212; and generally thermally laminating the film, particularly the biopolymer layer, to the rigid biopolymer structure, block 214.

In one embodiment, the rigid biopolymer structure is malleable and \thermally laminating includes thermally laminating the biopolymer layer to the rigid biopolymer structure with one or more adhesion or fixing devices, such as heated nip rollers, heated plates, ultrasonic welding devices or the like. In another embodiment, thermally laminating the biopolymer layer to the rigid biopolymer structure forms a rigid stock. A further embodiment includes shaping the rigid stock to form a container; depositing material in the container; and sealing the container with lidstock.

Figure 4:
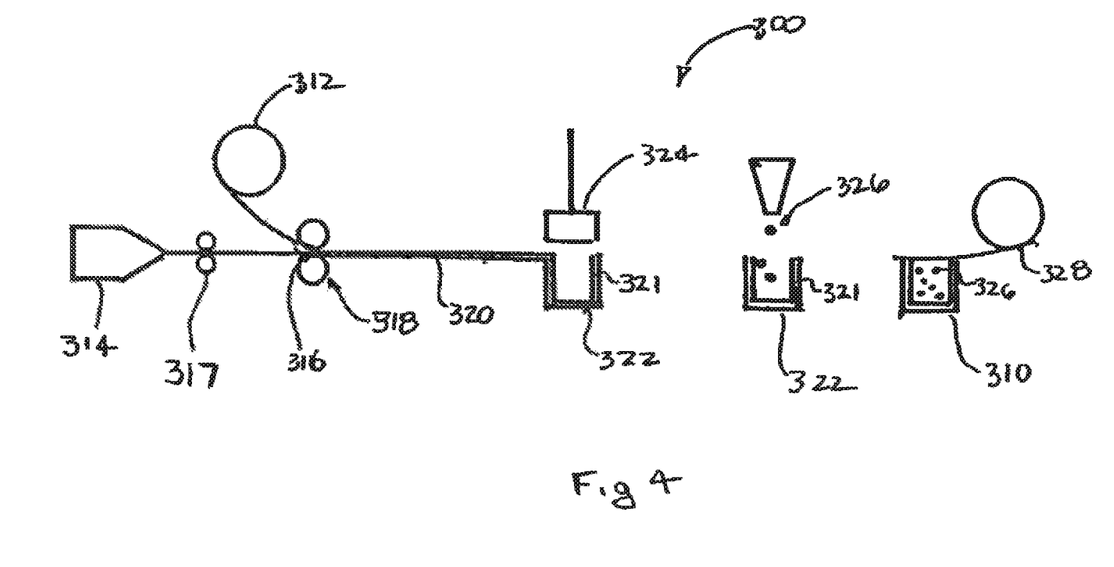
FIG. 4 is a schematic diagram of a system for forming thermally adhering a film to a rigid biopolymer structure, forming a container, and thereby forming a sealable package.

FIG. 4 illustrates a system, generally designated 300, for forming a filled container 310. The film 312, which includes a polymer layer, biopolymer layer, and adhesive layer, can be produced as discussed above in conjunction with FIG. 2. Referring to FIG. 4, the system 300 includes an extruder 314, producing the rigid biopolymer structure 316. The film 312 is thermally adherable or laminated to the rigid biopolymer structure 316 using devices 318 (which may include heated nip rollers, heated sealing plates, ultrasonic welding devices, and the like, as those skilled in the art will appreciate), forming a rigid stock 320. In one embodiment, the system 300 can also include chill rollers 317 to cool the rigid biopolymer structure 316.

In one embodiment, the rigid stock 320 is malleable while retaining heat from the extrusion. Although embodiments are contemplated in which the rigid stock 320 is cold (stored cold for example) and becoming malleable upon reheating. A container 322 in a container 321 is formed from the rigid stock 320 using a die 324. Those skilled in the art will appreciate that while the die 324 is illustrated as a male die, the container 321 can be formed with other methods, such as using molds (female or male molds), pressure forming, thermal forming, vacuum forming, combinations thereof and the like.

Material 326 (such as foodstuffs; machine parts; solids; liquids; powders; combinations of solids, liquids and/or powders; or other material) is deposited in the container 322. The container 322 is sealed with lidstock 328, forming the filled container 310. In one embodiment, the lidstock 328 is thermally adhered, laminated, heat sealed or ultrasonically welded to the container 321. Those skilled in the art will appreciate that other means such as heat sealing, ultrasonic welding, horizontal form filling, tray sealing or the like can be used for joining the lidstock 328 to the container 310. The system for forming the filled container 300 is not limited to the system 300, but can be any system desired for a particular application.

Figure 5:
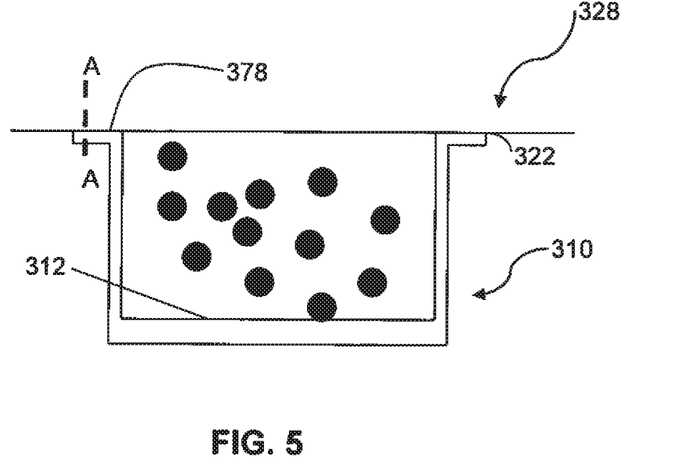
FIG. 5 is an enlarged view of the filled container of FIG. 4.

FIG. 5 is an enlarged view of the filled container 310 of FIG. 4. FIG. 5 illustrates the filled container 310 including lidstock 328 sealing the container plenum 322 with the material 326 in the container plenum 322 with seal 378. The seal 378 can be permanent or peelable. The film 312 may be thermally laminated; heat sealed or welded 322 to the rigid biopolymer structure 316.

Figure 6:
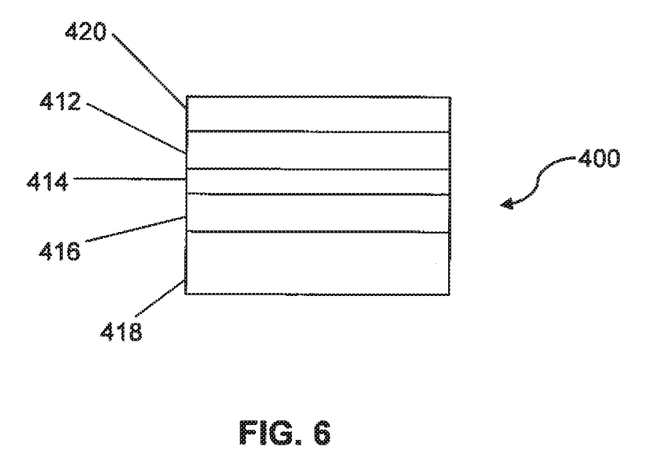
FIG. 6 is an enlarged view of cross-section taken along A-A of the wall of the filled container of FIG. 5.

FIG. 6 is an enlarged view of cross-section A-A of the wall of the filled container of FIG. 5 where the lidstock is sealed to the container. The wall 400 includes a polymer layer 412, an adhesive layer 414, and a biopolymer layer 416. In one embodiment, the biopolymer layer 416 is joined to a rigid biopolymer structure 418. In one embodiment, the biopolymer layer 418 is thicker than the biopolymer layer 416. Additionally, lidstock 420 is shown thermally laminated, heat sealed or welded to the polymer layer 412.

Figure 7:
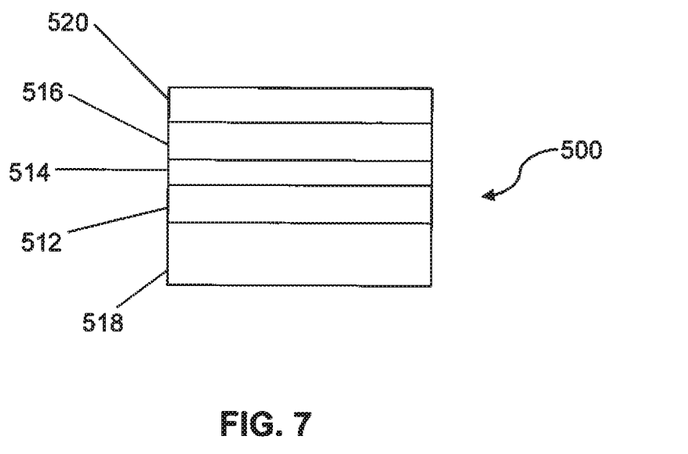
FIG. 7 is an enlarged view of the film in accordance with another embodiment of the present invention

FIG. 7 is an enlarged view of the film or seal 500, in accordance with one embodiment, including a biopolymer layer 516, an adhesive layer 514; and a polymer layer 512, such that the film 500 generally, or the polymer layer 512 in particular, is a barrier against moisture, oxygen, carbon dioxide, contaminants and/or aromas, or the like. In one embodiment, the biopolymer layer 516 is between about 0.0004 and about 0.006 inches thick (more particularly between about 0.0006 and about 0.003 inches thick); the polymer layer 512 (formed of a polyolefin material such as polyethylene, polypropylene or polystyrene; a polyamide material, such as nylon; some combination thereof; or the like for example) is between about 0.0008 and 0.005 inches thick (more particularly between about 0.001 and 0.003 inches thick).

FIG. 7 further illustrates the polymer layer 512 joined to a thick biopolymer layer 518 (alternatively referred to as a rigid biostructure), where in this embodiment, the rigid biostructure 518 is between about 0.007 and 0.060 inches thick (more particularly between about 0.010 and 0.045 inches thick). In this embodiment, a biopolymer lidstock 520 is shown thermally laminated, thermally adhered, heat sealed or welded to the biopolymer layer 516

Figure 8:
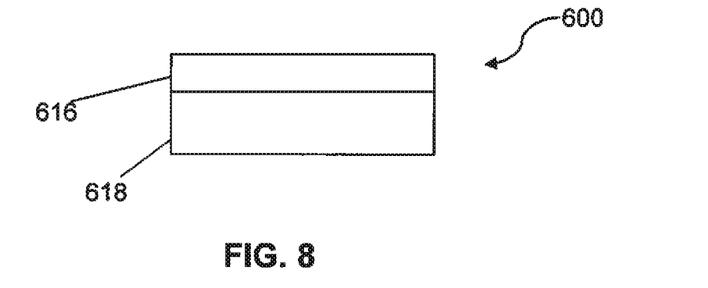
FIG. 8 is an enlarged view of the film in accordance with yet another embodiment of the present invention.

FIG. 8 is an enlarged view of a portion of a package formation 600, in accordance with one embodiment, including a biopolymer layer 616 and a thick biopolymer layer 618 (alternatively referred to as a thick biostructure), such that the film 600 generally, or the biopolymer layer 616 in particular is a barrier against moisture, oxygen, carbon dioxide, contaminants and/or aromas, or the like. In this embodiment, the biopolymer layer 616 is thermally laminated, thermally adhered, heat sealed or welded to the biopolymer layer 618. Further, in one embodiment, the biopolymer layer 616 is between about 0.0004 and about 0.006 inches thick (more particularly between about 0.0006 and about 0.003 inches thick) and the thick biostructure 616 is between about 0.007 and 0.060 inches thick (more particularly between about 0.010 and 0.045 inches thick). In one embodiment, at least one of the biopolymer layer 616 and the rigid biopolymer structure is a material selected from the group consisting of polylactide acid, aliphatic-aromatic polyesters, biopolymeric resins, poly(3-hydroxyalkanoate) (PHA), cellulose and starch based polymers. This is done primarily to match the two layers together with different properties so that the combined structure resists cracking, shattering, makes it more flexible and/or reduces brittleness. This works with polymer based materials, but PLA-PLA is preferred.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

The invention claimed is:

1. A film thermally adhered to a rigid structure, the film comprising:
    a polymer layer, wherein the polymer layer is a material selected from the group consisting of polyolefins and polyamides and the polymer layer has a thickness of about 0.0008 to about 0.005 inches;
    a second layer adjacent to the rigid structure, wherein the second layer is a material selected from a group consisting of polylactide acid, aliphatic-aromatic polyesters, poly(3-hydroxyalkanoate) (PHA), cellulose and starch based polymers and has a thickness of about 0.0008 to about 0.006 inches; and
    an adhesive layer joining the polymer layer to the second layer, wherein the joined polymer layer and second layer have a bond strength greater than 800 grams per inch of pull, the second layer is thermally adhered to the rigid structure and the rigid structure comprises a material selected from the group consisting of polylactide acid, aliphatic-aromatic polyesters, poly(3-hydroxyalkanoate) (PHA), cellulose and starch based polymers.

2. The film of claim 1, wherein the polymer layer is a material selected from the group consisting of linear low-density polyethylene, low-density polyethylene, ultra-low density polyethylene, metallocene polyethylene, ethylene vinyl acetate (EVA), ionomers, polypropylene, polystyrene and nylon.

3. The film of claim 1 wherein the polymer layer is a barrier against matter selected from the group consisting of moisture, oxygen, carbon dioxide, contaminants and aroma.

4. The film of claim 1 wherein the polymer layer is a multilayer polymer layer that is a breathable polymer layer.

5. The film of claim 1 wherein the polymer layer is a multilayer barrier polymer layer.

6. The film of claim 1 wherein the polymer layer is a monolayer polymer layer that is a breathable polymer layer.

7. The film of claim 1 wherein the polymer layer contains contaminants that create peelability.

8. The film of claim 1 wherein the second layer is between about 0.0008 and about 0.003 inches thick.

9. The film of claim 1 wherein the polymer layer is between about 0.001 and about 0.003 inches thick.

10. The film of claim 1 wherein the polymer layer is joined to the second layer having a bond strength greater than 1000 grams per inch of pull.

11. The film of claim 1 wherein the rigid structure has a substantially uniform thickness between about 0.007 and about 0.060 inches.

12. A film thermally adhered to a rigid structure, the film comprising:
    a layer selected from a group consisting of polylactide acid, aliphatic-aromatic polyesters, poly(3-hydroxyalkanoate) (PHA), cellulose and starch based polymers;
    a polymer layer selected from the group consisting of polyolefins and polyamides; and
    an adhesive layer joining the layer to the polymer layer;
    wherein the rigid structure comprises a material selected from the group consisting of polylactide acid, aliphatic-aromatic polyesters, poly(3-hydroxyalkanoate) (PHA), cellulose and starch based polymers and is adjacent to the layer and joined thereto.

13. The film of claim 12 further comprising a lid stock joined to the layer.

14. The film of claim 12, wherein the polymer layer is a barrier against matter selected from the group consisting of moisture, oxygen, carbon dioxide, contaminants and aroma.

15. A package formation comprising:
    a layer selected from a group consisting of polylactide acid, aliphatic-aromatic polyesters, poly(3-hydroxyalkanoate) (PHA), cellulose and starch based polymers;
    a polymer layer attached to the layer, the polymer layer being selected from the group consisting of polyolefins and polyamides; and
    a rigid structure selected from a group consisting of polylactide acid, aliphatic-aromatic polyesters, poly(3-hydroxyalkanoate) (PHA), and starch based polymers adjacent to the layer, wherein the layer is adhered to the rigid structure.

16. The package formation of claim 15 wherein the layer is between about 0.0004 and about 0.006 inches thick.

17. The package formation of claim 15 wherein the rigid structure has a substantially uniform thickness between about 0.007 and about 0.060 inches.

18. The package formation of claim 15 wherein adhering the layer to the rigid structure prevents cracking of at least the formation and, prevents shattering of at least the formation.

19. A film for thermal adhesion to a rigid structure, the film comprising: a polymer layer containing contaminants that create peelability;
   a second layer adjacent to the rigid structure, wherein the polymer layer is a material selected from the group consisting of polyolefins and polyamides, the second layer and the rigid structure are each a material selected from the group consisting of polylactide acid, aliphatic-aromatic polyesters, poly(3-hydroxyalkanoate) (PHA), cellulose and starch based polymers; and an adhesive layer joining the polymer layer to the second layer.

20. The film of claim 19, wherein the polymer layer is a material selected from the group consisting of linear low-density polyethylene, low-density polyethylene, ultra-low density polyethylene, metallocene polyethylene, ethylene vinyl acetate (EVA), ionomers, polypropylene, polystyrene and nylon.

21. The film of claim 19 wherein the polymer layer is a barrier against matter selected from the group consisting of moisture, oxygen, carbon dioxide, contaminants and aroma.

22. The film of claim 19 wherein the polymer layer is a multilayer polymer layer that is a breathable polymer layer.

23. The film of claim 19 wherein the polymer layer is a multilayer barrier polymer layer.

\* \* \* \* \*